US011976836B2

(12) United States Patent
Friend et al.

(10) Patent No.: US 11,976,836 B2
(45) Date of Patent: May 7, 2024

(54) THERMOSTAT WITH PRE-CONFIGURED PROFILE LISTING

(71) Applicant: Johnson Controls Tyco IP Holdings LLP, Milwaukee, WI (US)

(72) Inventors: Richard David Friend, Levittown, PA (US); Justin C. Pasquale, West Chester, PA (US); Joshua J. Yagy, Largo, FL (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 36 days.

(21) Appl. No.: 17/514,529

(22) Filed: Oct. 29, 2021

(65) Prior Publication Data

US 2023/0133596 A1 May 4, 2023

(51) Int. Cl.
*F24F 11/64* (2018.01)
*F24F 11/523* (2018.01)
*F24F 11/59* (2018.01)

(52) U.S. Cl.
CPC ............ *F24F 11/64* (2018.01); *F24F 11/523* (2018.01); *F24F 11/59* (2018.01)

(58) Field of Classification Search
CPC .......... F24F 11/64; F24F 11/523; F24F 11/59
See application file for complete search history.

(56) References Cited

U.S. PATENT DOCUMENTS

| 8,725,299 | B2 | 5/2014 | Hess et al. |
| 10,866,572 | B2 | 12/2020 | Kuckuk et al. |
| 2011/0166712 | A1* | 7/2011 | Kramer .............. G05D 23/1919 700/278 |
| 2011/0218691 | A1* | 9/2011 | O'Callaghan .......... G06Q 10/06 700/295 |
| 2013/0345883 | A1* | 12/2013 | Sloo ....................... G05B 15/02 700/276 |

(Continued)

OTHER PUBLICATIONS

Honeywell TC500A Commercial Thermostat Connected Device for Commercial Buildings, Retrieved form the Internet on May 27, 2022 (8 pages).

(Continued)

*Primary Examiner* — Christopher E. Everett
*Assistant Examiner* — Tameem D Siddiquee
(74) *Attorney, Agent, or Firm* — Foley & Lardner LLP

(57) ABSTRACT

A thermostat includes a user interface, a memory, and a processor. The memory is configured to store a profile listing including a plurality of preset profiles. Each of the plurality of preset profiles is associated with a respective temperature regulation unit. The processor is configured to perform a profile selection process when the thermostat is powered on for a first time. To perform the profile selection process, the processor is configured to display a profile selection graphical user interface in response to powering on for the first time where the profile selection graphical user interface facilitates selecting a respective profile from the plurality of preset profiles based on a temperature regulation unit connected to the thermostat, receive a selection of the respective profile based on an input provided to the user interface, and configure the thermostat according to the respective profile to facilitate controlling the temperature regulation unit connected thereto.

17 Claims, 5 Drawing Sheets

(56) References Cited

U.S. PATENT DOCUMENTS

2014/0113563 A1* 4/2014 Almomani ......... G07C 9/00817
70/263
2019/0323723 A1* 10/2019 Beauregard .............. F24F 11/88

OTHER PUBLICATIONS

Johnson Controls—FCP Non-Programmable and Programmable Fan Coil or PTAC Thermostat Product Bulletin, Sep. 21, 2020 (4 pages).
Johnson Controls—FCP-PA-701-N—Programmable Fan Coil Series Thermostat via Jackson Systems & Supply Website, retrieved from the internet on May 27, 2022 (5 pages).
Johnson Controls: FCP Non-Programmable and Programmable Fan Coil or PTAC Thermostat Quick Start Guide, Nov. 2020 (10 pages).
Johnson Controls: Introducing the FCP Non-Programmable and Programmable Fan Coil Package retrieved from Building Controls Group website on May 27, 2022 (4 pages).

* cited by examiner

THERMOSTAT WITH PRE-CONFIGURED PROFILE LISTING

BACKGROUND

The present disclosure relates generally to the field of systems that include a thermostat and either a fan coil unit ("FCU") or a packaged terminal air conditioner ("PTAC"). A thermostat is, in general, a controller configured to monitor temperature of a space and control and manage equipment (e.g., a FCU, a PTAC, etc.) to maintain a desired temperature set point within a space.

SUMMARY

One embodiment relates to a temperature regulation system. The temperature regulation system includes a thermostat. The thermostat includes a user interface, a memory, and a processor. The memory is configured to store a profile listing including a plurality of preset profiles. Each of the plurality of preset profiles is associated with a respective temperature regulation unit. The processor is configured to perform an initial boot up and profile selection process when the thermostat is powered on for a first time. To perform the initial boot up and profile selection process, the processor is configured to transition the thermostat from an initial off state to a boot up state in response to the thermostat being powered on for the first time, transition from the boot up state directly to a profile selection state in response to the thermostat booting up for the first time where (i) transitioning from the boot up state to the profile selection state includes displaying a profile selection graphical user interface on a display of the user interface and (ii) the profile selection graphical user interface facilitates selecting a respective profile from the plurality of preset profiles based on a temperature regulation unit connected to the thermostat, receive a selection of the respective profile based on a user input provided to the user interface, and configure the thermostat according to the respective profile to facilitate controlling the temperature regulation unit connected thereto.

Another embodiment relates to a method for configuring a thermostat. The method includes storing a profile listing including a plurality of preset profiles onto a memory of the thermostat during manufacture of the thermostat, each of the plurality of preset profiles associated with a respective temperature regulation unit; installing the thermostat within a room including an installed temperature regulation unit; powering on the thermostat for a first time; displaying, by the thermostat, a profile selection graphical user interface in response to powering on for the first time where the profile selection graphical user interface facilitates selecting a respective profile from the plurality of preset profiles based on the installed temperature regulation unit connected to the thermostat; receiving, by the thermostat, a selection of the respective profile based on a user input provided to a user interface of the thermostat; and configuring, by the thermostat, the thermostat according to the respective profile to facilitate controlling the installed temperature regulation unit connected thereto.

Still another embodiment relates to a temperature regulation system. The temperature regulation system includes a thermostat. The thermostat includes a user interface, a memory, and a processor. The memory is configured to store a profile listing including a plurality of preset profiles. Each of the plurality of preset profiles is associated with a respective temperature regulation unit. The processor is configured to perform a profile selection process when the thermostat is powered on for a first time. To perform the profile selection process, the processor is configured to display a profile selection graphical user interface in response to powering on for the first time where the profile selection graphical user interface facilitates selecting a respective profile from the plurality of preset profiles based on a temperature regulation unit connected to the thermostat, receive a selection of the respective profile based on a user input provided to the user interface, and configure the thermostat according to the respective profile to facilitate controlling the temperature regulation unit connected thereto.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
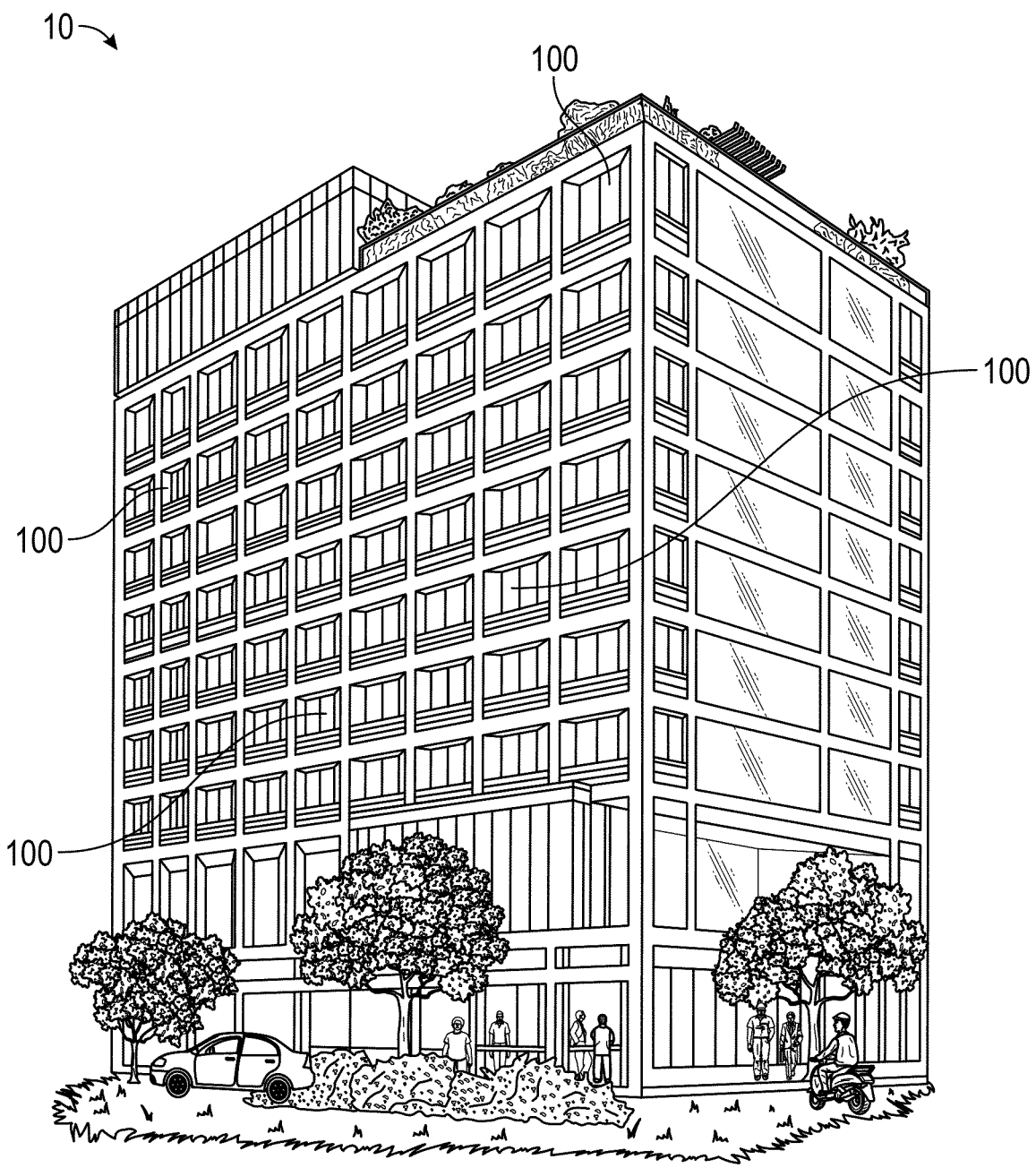
FIG. 1 is a drawing of a building having a plurality of rooms that are each equipped with an individual thermal management system, according to an exemplary embodiment.
Figure 2:
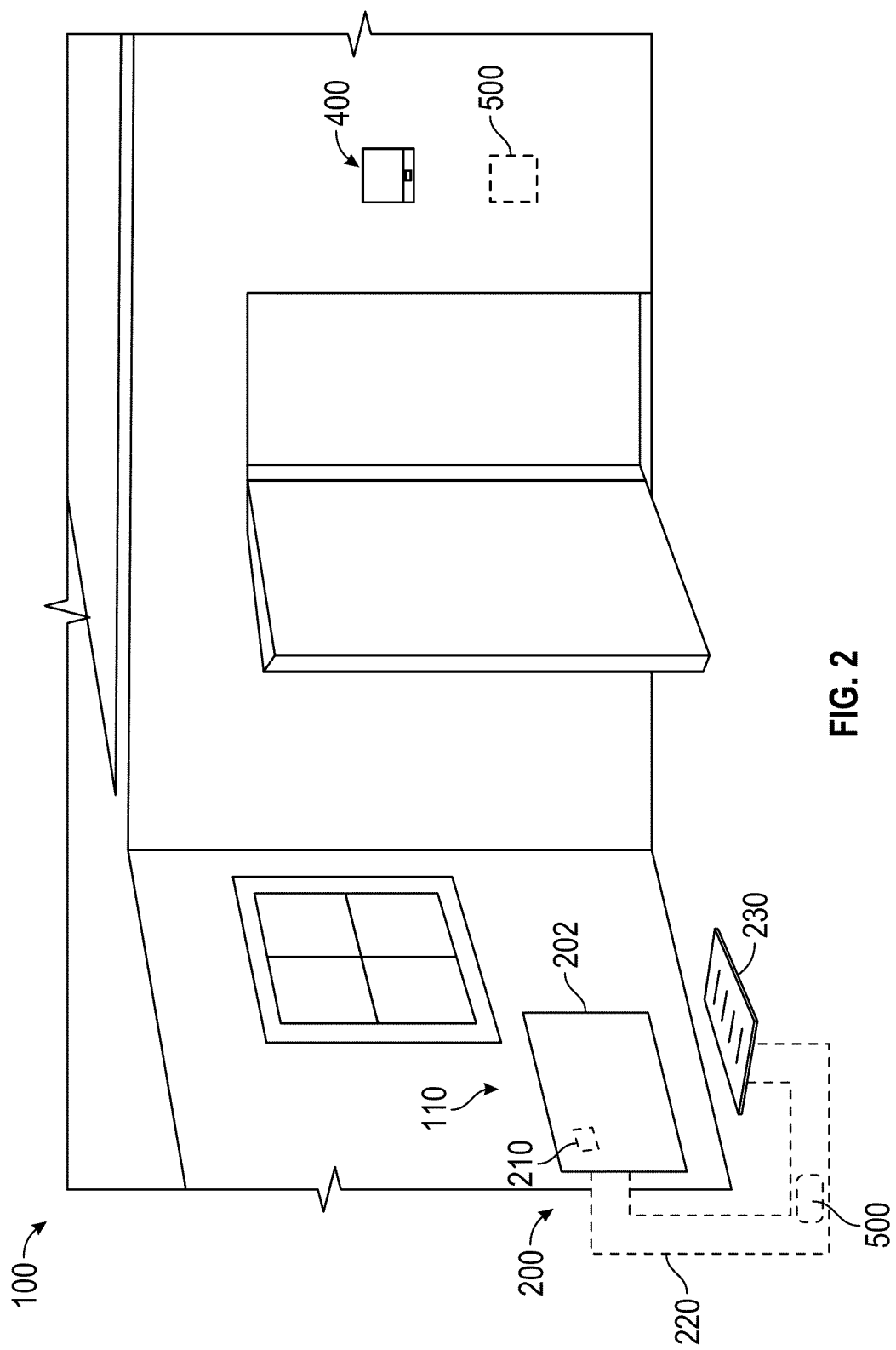
FIG. 2 is a drawing of one of the rooms of the building of FIG. 1 having a thermal management system including a thermostat and a FCU, according to an exemplary embodiment.
Figure 3:
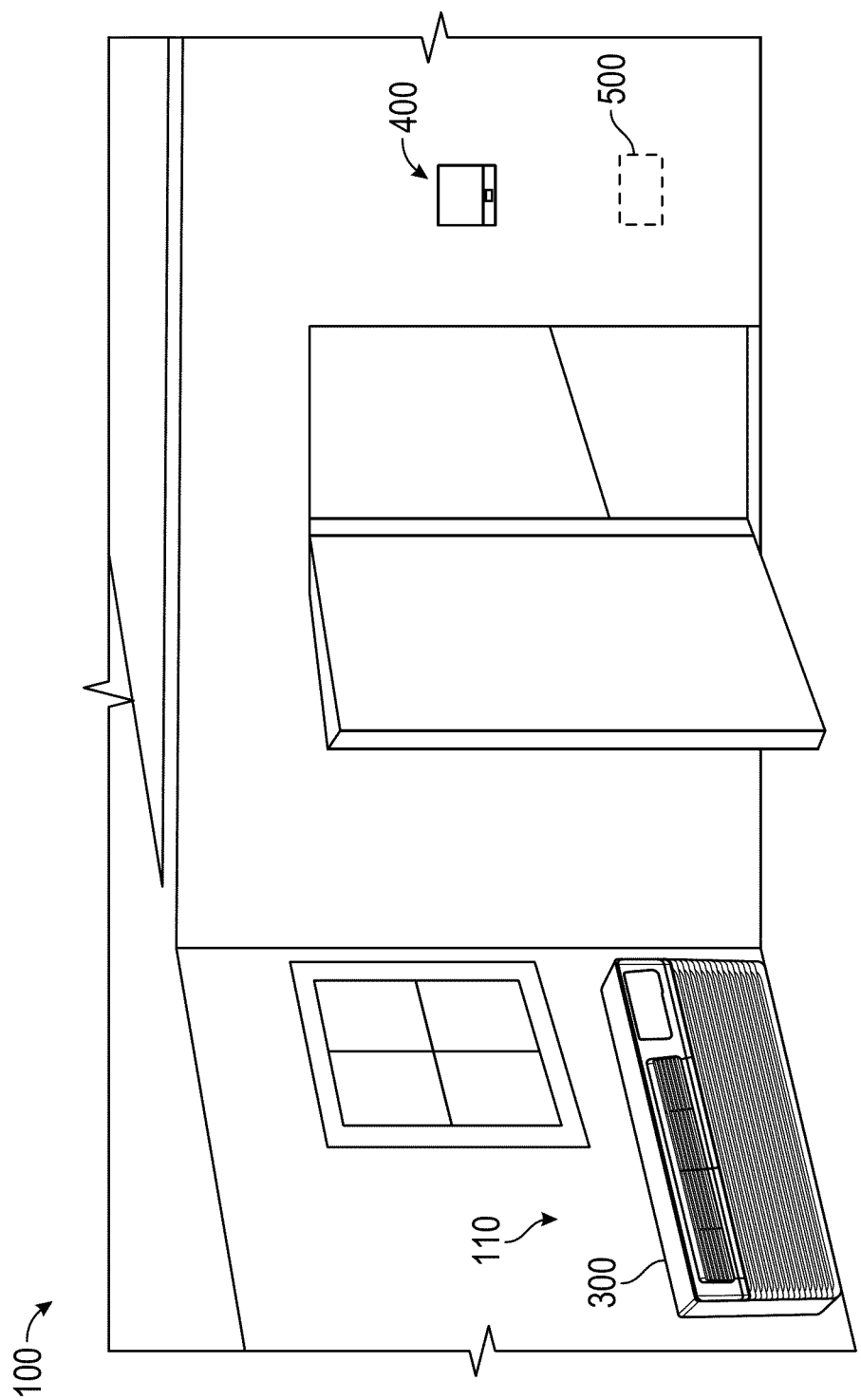
FIG. 3 is a drawing of one of the rooms of the building of FIG. 1 having a thermal management system including a thermostat and a PTAC, according to another exemplary embodiment.

As shown in FIG. 1, a structure, shown as building 10, includes a plurality of individual rooms (e.g., guest rooms, offices, etc.), shown as rooms 100. The building 10 may be, for example, a hotel, a motel, a dormitory, an office building, a skyscraper, a hospital, an apartment building, a condominium, and/or still another type of building that has a plurality of individual rooms. As shown in FIGS. 2 and 3, each of the rooms 100 includes a thermal management system (e.g., a heating, air conditioning, and ventilation ("HVAC") system), shown as temperature regulation system 110. According to an exemplary embodiment, the temperature regulation system 110 is configured to monitor and regulate a temperature and/or other characteristics (e.g., humidity, air quality, etc.) within the room 100 to maintain the temperature and/or the other characteristics at a desired setpoint (e.g., set by the occupant, set by the building manager, etc.).

According to the exemplary embodiment shown in FIG. 2, the temperature regulation system 110 is a FCU-based temperature regulation system that includes a first type of temperature regulation unit, shown as FCU 200. As shown in FIG. 2, the FCU 200 includes a main housing, shown as FCU housing 202, integrated into or disposed within the wall of the room 100. In other embodiments, the FCU housing 202 is integrated into the ceiling of the room 100. According to an exemplary embodiment, the FCU housing 202 includes various components including, but not limited to, one or more coils (e.g., a heating coiling, a cooling coil, a dual function coil, etc.), a fan or blower device, filters, etc. In one embodiment, the FCU 200 is a 2-pipe FCU that has a single coil. The single coil of such a 2-pipe FCU may provide a heating functionality and a cooling functionality separately depending on a mode of operation of the building 10 (e.g., based on a changeover date between heating and cooling for the building 10), or may only be capable of providing one of the heating functionality or the cooling functionality. In another embodiment, the FCU 200 is a 4-pipe FCU that has two coils—a first coil that provides heating functionality and a second coil that provides cooling functionality. Such a 4-pipe FCU can, therefore, provide both heating and cooling functionality separately or at the same time and independent of a mode of the building 10. As shown in FIG. 2, the FCU 200 includes a FCU sensor, shown as pipe sensor 210. According to an exemplary embodiment, the pipe sensor 210 is configured to facilitate monitoring a temperature of a working fluid (e.g., water, etc.) flowing through the heating coil and/or the cooling coil. In some embodiments, the FCU 200 includes multiple pipe sensors 210 (e.g., a first pipe sensor for the heating coil and a second pipe sensor for the cooling coil).

As shown in FIG. 2, the FCU 200 includes ducting, shown as air ducts 220, that extend from the FCU housing 202, to one or more outlets, shown as outlet vents 230, positioned about the room 100. The outlet vents 230 may be positioned on the floor, the walls, and/or the ceiling of the room 100. According to an exemplary embodiment, the components within the FCU housing 202 are configured to draw in ambient air, heat or cool the ambient air (depending on the mode of operation and/or the functionality of the FCU 200), and provide the heated or cooled air to the room 100 through the air ducts 220 and the outlet vents 230.

According to the exemplary embodiment shown in FIG. 3, the temperature regulation system 110 is a PTAC-based temperature regulation system that includes a second type of temperature regulation unit, shown as PTAC 300. According to an exemplary embodiment, the PTAC 300 is a self-contained heating and/or air conditioning system with a first portion positioned internal to the room 100 along a wall thereof and a second portion positioned external to the room 100. In one embodiment, the PTAC 300 includes a heat pump and a reversing valve that facilitates providing both heating and cooling functionality with the PTAC 300. In another embodiment, the PTAC 300 facilitates only providing cooling functionality.

Figure 4:
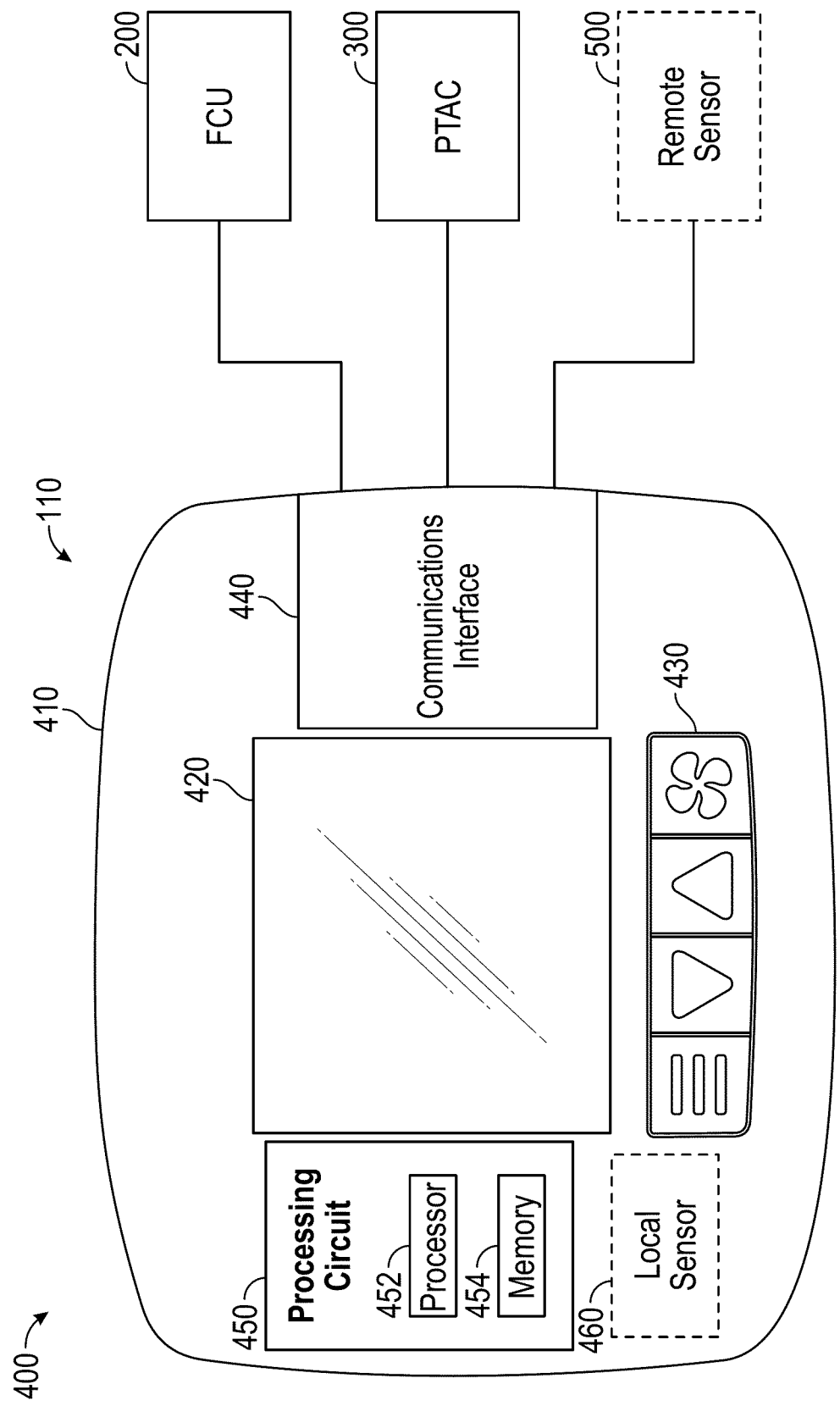
FIG. 4 is a block diagram of the thermal management system of FIGS. 2 and 3, according to an exemplary embodiment.

As shown in FIGS. 2-4, the temperature regulation system 110 includes a controller, shown as thermostat 400. In some embodiments, the thermostat 400 is sold or provided separate from the FCU 200 and the PTAC 300. In other embodiments, the thermostat 400 is sold or provided in a kit with the FCU 200 or the PTAC 300. As shown in FIG. 4, the thermostat 400 includes a housing, shown as thermostat housing 410, having a user interface including a first interface, shown as display 420, and a second interface, shown as user input 430, disposed along an exterior thereof. The user input 430 may be physical buttons or a touch interface. In some embodiment, the display 420 and the user input 430 are combined as a touch screen user interface. As shown in FIG. 4, the thermostat 400 also includes a communications interface 440, a processing circuit 450, and a local sensor 460 disposed within the thermostat housing 410. In some embodiments, the thermostat 400 does not include the local sensor 460.

As shown in FIGS. 2 and 3, the thermostat 400 is installed on a wall of the room 100 such that the thermostat 400 is disposed within the environment of the room 100. In such embodiments, the thermostat 400 may include the local sensor 460. In some embodiments, the thermostat 400 is, instead, installed within an enclosure (e.g., a case, a cabinet, etc.) such that the thermostat 400 may not be disposed directly within the environment of the room 100. In such embodiments, the temperature regulation system 110 may include an independent sensor, shown as remote sensor 500, positioned remote from the thermostat 400 (i.e., outside of the thermostat housing 410). In some embodiments, as shown in FIGS. 2 and 3, the remote sensor 500 may be positioned within the room 100. Additionally or alternatively, the remote sensor 500 may be positioned within the air duct 220 of the FCU 200. The remote sensor 500 may be configured to perform similar functions as the local sensor 460. The remote sensor 500 may replace the local sensor 460 or supplement the local sensor 460. The local sensor 460 and/or the remote sensor 500 may be configured to facilitate monitoring characteristics within the room 100 such as room temperature, regulated air temperature provided by the FCU 200 or the PTAC 300, room humidity, room air quality, room occupancy, and/or still other characteristics within the room 100.

The communications interface 440 may include wired or wireless interfaces (e.g., jacks, antennas, transmitters, receivers, transceivers, wire terminals, etc.) for conducting data communications with various systems, devices, or networks. For example, the communications interface 440 may include an Ethernet card and port for sending and receiving data via an Ethernet-based communications network and/or a WiFi transceiver for communicating via a wireless communications network. The communications interface 440 may be configured to communicate via local area networks or wide area networks (e.g., the Internet, a building WAN, etc.) and may use a variety of communications protocols (e.g., BACnet, IP, LON, Bluetooth, ZigBee, radio, cellular, etc.).

The communications interface 440 of the thermostat 400 may facilitate communicating with the FCU 200, the PTAC 300, and/or the remote sensor 500. Communication between and among (i) the thermostat 400 and (ii) the FCU 200, the PTAC 300, and/or the remote sensor 500 may be via any number of wired or wireless connections (e.g., any standard under IEEE 802, etc.). For example, a wired connection may include a serial cable, a fiber optic cable, a CAT5 cable, or any other form of wired connection. In comparison, a wireless connection may include the Internet, Wi-Fi, cellular, Bluetooth, ZigBee, radio, BACnet, etc. In one embodiment, a controller area network ("CAN") bus provides the exchange of signals, information, and/or data. The CAN bus can include any number of wired and wireless connections that provide the exchange of signals, information, and/or data. The CAN bus may include a local area network ("LAN"), or a wide area network ("WAN"), or the connection may be made to an external computer (for example, through the Internet using an Internet Service Provider).

As shown in FIG. 4, the processing circuit 450 of the thermostat 400 includes a processor 452 and a memory 454. The processor 452 may be implemented as a general-purpose processor, an application specific integrated circuit ("ASIC"), one or more field programmable gate arrays ("FPGAs"), a digital signal processor ("DSP"), a group of processing components, or other suitable electronic processing components. The memory 454 (e.g., NVRAM, RAM, ROM, Flash Memory, hard disk storage, etc.) may store data and/or computer code for facilitating the various processes described herein. Thus, the memory 454 may be communicably connected to the processor 452 and provide computer code or instructions to the processor 452 for executing the processes described in regard to the thermostat 400 herein. Moreover, the memory 454 may be or include tangible, non-transient volatile memory or non-volatile memory. Accordingly, the memory 454 may include database components, object code components, script components, or any other type of information structure for supporting the various activities and information structures described herein.

The memory 454 may include various modules for completing the activities described herein. More particularly, the memory 454 may include a communication module, a profile module, a detection module, and/or a control module. The modules may be configured to acquire a selection of a profile of the thermostat 400 to implement and facilitate correctly and accurately configuring and controlling operation of the FCU 200 or the PTAC 300 according to the selected profile. While various modules with particular functionality are described herein, it should be understood that the thermostat 400 and the memory 454 may include any number of modules for completing the functions described herein. For example, the activities of multiple modules may be combined as a single module, as additional modules with additional functionality may be included, etc. Further, it should be understood that the thermostat 400 may further control other activity beyond the scope of the present disclosure.

According to an exemplary embodiment, the communications module is configured to send and receive information (e.g., data, commands, etc.) between (i) the thermostat 400 and (ii) the FCU 200, the PTAC 300, the remote sensor 500, and/or still other components (e.g., a remote server, a supervisory system within the building 10, etc.). Thus, the communication module may be communicably and/or operatively coupled with the communications interface 440. In some embodiments, the communications module is configured to facilitate receiving a profile selection or a manual profile configuration from an operator via the user input 430 or an external device (e.g., a smartphone, a remote server, a supervisory system within the building 10, etc.). The communications module may then transmit the profile selection or the manual profile configuration to the profile module to take further action, as described further herein. In some embodiments, the communications module is configured to receive unit information (e.g., type information, sensor information, accessory information, etc.) from the FCU 200 or the PTAC 300 connected to the thermostat 400. The communications module may then transmit the unit information to the detection module to take further action, as described further herein. In some embodiments, the communications module is configured to facilitate receiving a desired setpoint from an operator via the user input 430 and/or an external device (e.g., a smartphone, a remote server, a supervisory system within the building 10, etc.). The communications module may then transmit the desired setpoint to the control module to take further action, as described further herein. In some embodiments, the communications module may be configured to receive sensor data from the remote sensor 500 and/or the pipe sensor 210. The communications module may then transmit the sensor data to the control module to take further action, as described further herein. In some embodiments, the communication module is configured to receive commands from the control module and transmit such commands to the FCU 200 and/or the PTAC 300 to initiate and facilitate proper operation of the FCU 200 or the PTAC 300, as described further herein.

According to an exemplary embodiment, the profile module is configured to receive and store a profile listing including a plurality of individual, preset profiles. The profile module may be further configured to transmit a manually-selected profile from the profile listing to the command module to take further action, as described in further detail herein. According to an exemplary embodiment, the plurality of individual, preset profiles are user selectable profiles that are pre-loaded onto the thermostat 400, each focusing on a unique combination of features and accessories of various different FCUs 200 and PTACs 300 (e.g., that are produced and sold by the manufacturer of the thermostat 400, that are produced and sold by other FCU/PTAC manufacturers, that are not unique to the specific customer or end user, etc.).

An example of a pre-configured profile listing stored within the profile module of the processing circuit 450 is shown in Table 1. The preset profiles of the profile listing shown in Table 1 apply to a variety of system types including 2-pipe FCUs, 4-pipe FCUs, PTACs with cooling and heating functionality, and PTACs with only cooling functionality. The profiles also include a "reset" profile that returns the thermostat 400 back to factory settings with no profile being set. Table 1 also identifies various different combinations of features and accessories that can be implemented with each system type, including identifying (a) if the system type is a 2-pipe FCU, whether the 2-pipe FCU includes an auxiliary heater; (b) the type of reversing valve used with a heat pump ("HP") of the PTAC B a reversing valve that is energized in the heat pump's heating mode, O—a reversing valve that is energized in the heat pump's cooling mode); (c) available modes for each of the FCUs and PTACs (e.g., 1—heat only, 2—cooling only, 3—heating and cooling with auto, 4—heating and cooling without auto); (d) the number of fan speeds (e.g., 2 (high or low) or 3 (high, low, or off)); (e) whether the temperature regulation system 110 includes the remote sensor 500; (f) the location of the remote sensor 500 (e.g., 0—in the room 100, 1—in the air duct 220); (g) whether the temperature regulation system 110 includes the pipe sensor 210; (h) the pipe/coil state (e.g., 0—heat only, 1—cooling only); and (i) whether the temperature regulation system 110 is associated with a pipe state calendar (i.e., whether the building 10 changes over from heating only to cooling only and vice versa). It should be noted that the profiles provided in Table 1 are provided as an example and should not be considered as limiting as other profiles may be possible.

TABLE 1

Selectable Profiles

| Profile | System Type | 2-Pipe FCU w/Auxiliary Heat | HP Valve Type | Available Modes | # of Fan Speeds | Remote Sensor | Remote Sensor Location | Pipe Sensor | Pipe State | Pipe State Calendar |
|---|---|---|---|---|---|---|---|---|---|---|
| 1 | 2-pipe FCU | Y | — | 3 | 3 | Y | 0 | Y | — | off |
| 2 | 2-pipe FCU | Y | — | 3 | 3 | Y | 1 | Y | — | off |
| 3 | 2-pipe FCU | N | — | 4 | 3 | Y | 0 | Y | — | off |
| 4 | 2-pipe FCU | N | — | 4 | 3 | Y | 1 | Y | — | off |
| 5 | 2-pipe FCU | Y | — | 3 | 3 | Y | 0 | N | — | on |
| 6 | 2-pipe FCU | Y | — | 3 | 3 | Y | 1 | N | — | on |
| 7 | 2-pipe FCU | N | — | 4 | 3 | Y | 0 | N | — | on |
| 8 | 2-pipe FCU | N | — | 4 | 3 | Y | 1 | N | — | on |
| 9 | 2-pipe FCU | Y | — | 3 | 3 | N | — | Y | — | off |
| 10 | 2-pipe FCU | N | — | 4 | 3 | N | — | Y | — | off |
| 11 | 2-pipe FCU | Y | — | 3 | 3 | N | — | N | — | on |
| 12 | 2-pipe FCU | N | — | 4 | 3 | N | — | N | — | on |
| 13 | 2-pipe FCU | N | — | 4 | 3 | N | — | N | 0 | off |
| 14 | 2-pipe FCU | N | — | 4 | 3 | N | — | N | 1 | off |
| 15 | 4-Pipe FCU | — | — | 3 | 3 | Y | 0 | N | — | — |
| 16 | 4-Pipe FCU | — | — | 3 | 3 | Y | 1 | N | — | — |
| 17 | 4-Pipe FCU | — | — | 3 | 3 | N | — | N | — | — |
| 18 | PTAC-HP | — | O | 3 | 2 | N | — | N | — | — |
| 19 | PTAC-HP | — | B | 3 | 2 | N | — | N | — | — |
| 20 | PTAC-H-C | — | — | 3 | 2 | N | — | N | — | — |
| 99 | Reset | — | — | — | — | — | — | — | — | — |

In some embodiments, the profile module is additionally configured to facilitate receiving and storing custom profiles generated by a user via the user input 430 or an external device (e.g., a smartphone, a remote server, a supervisory system within the building 10, etc.). The user may select to overwrite one or more of the preset profiles with the custom profile or store the custom profile without overwriting any of the preset profiles (e.g., if there is available free memory). The profile module may be further configured to transmit the custom profile to the command module to take further action, as described in further detail herein.

In some embodiments, the processing circuit 450 includes the detection module. According to an exemplary embodiment, the detection module is configured to automatically detect and select which of the preset profiles to implement based on the unit information acquired from the FCU 200 or the PTAC 300 connected to the thermostat 400. The detection module may be further configured to extract the proper preset profile from the profile module based on the unit information and transmit the extracted, auto-selected, preset profile to the command module to take further action, as described in further detail herein. In other embodiments, the detection module is configured to detect which of the preset profiles is associated with the unit information and provide a recommendation (e.g., with a recommendation graphical user interface ("GUI") via the display 420) to the user to assist in the manual selection of the preset profile.

According to an exemplary embodiment, the command module is configured to receive the manually-selected profile from the profile module, the custom profile from the profile module, or the auto-selected profile from the detection module and implement the manually-selected profile, the custom profile, or the auto-selected profile. When the command module implements a profile, the thermostat 400 becomes configured to properly operate the FCU 200 or the PTAC 300 connected therewith, accounting for the specific combination of features and accessories associated with the respective FCU 200 or PTAC 300.

In some embodiments, the command module is configured to receive the desired setpoint from the communications module, the sensor data from the communications module (e.g., acquired by the remote sensor 500, the pipe sensor 210, etc.), and/or the sensor data from the local sensor 460. The command module may be configured to analyze the sensor data in view of the setpoint and transmit commands to the FCU 200 or the PTAC 300 connected therewith to facilitate proper operation of the FCU 200 or the PTAC 300, in view of the applied profile, to provide and maintain the desired setpoint.

Figures 5, 6, 7, 8:
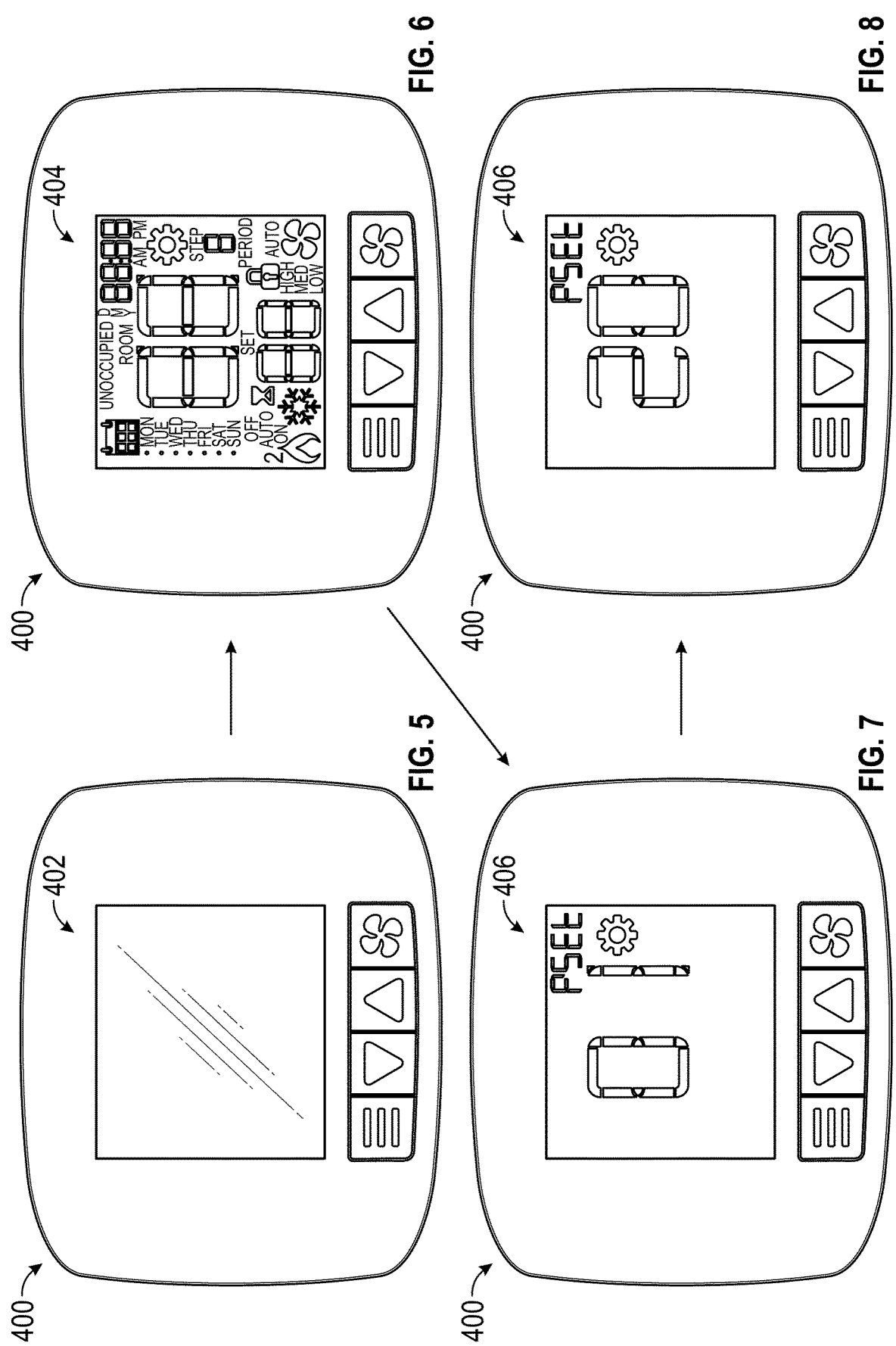
FIGS. 5-8 are various views of a display of the thermostat of FIGS. 2-4 illustrating a profile selection process for configuring the thermostat at initial installation and startup, according to an exemplary embodiment.

According to an exemplary embodiment, the processing circuit 450 is configured to direct a user to a profile selection GUI upon the first, initial startup of the thermostat 400. Such a process is shown in FIGS. 5-8. As shown in FIG. 5, the thermostat 400 is in an initial manufacture state 402 having never been started up or turned on. As shown in FIG. 6, the thermostat 400 is in a booting or boot up state 404 where the thermostat 400 is connected to a power source and/or turned on for the first time. As shown in FIGS. 7 and 8, the thermostat 400 transitions to a profile selection state 406 once the thermostat 400 completes booting up the first time by providing the profile selection GUI. According to the exemplary embodiment shown in FIGS. 7 and 8, the profile selection GUI transitions between a plurality of individual GUIs, one associated with each of the preset profiles. In some embodiments, the individual GUIs provide details regarding the FCU 200 or PTAC 300 to which it relates. In other embodiments, as shown in FIGS. 7 and 8, the individual GUIs provide minimal information such as simply an identifier (e.g., a number) of the profile. In such embodiments, the thermostat 400 may be provided with a physical listing (e.g., in the instruction manual, on the packaging, etc.) or information (e.g., a URL, a QR code, etc.) on where or how to access a virtual listing that explains the various preset profiles in greater detail. In another embodiment, the profile selection GUI provides a listing of the all the profiles on a single GUI. When in the profile selection state 406, the user can use the user input 430 to cycle through the preset profiles (see, e.g., Table 1) provided via the profile selection GUI. In some embodiments, the processing circuit 450 is configured to display a preset profile at or proximate the middle of the profile listing (e.g., the GUI associated with profile 10 of 20, the GUI associated with profile 11 of 20, etc.) such that the user does not have to start from a first profile GUI (e.g., the GUI associated with profile 1) and cycle all the way through all of the profiles GUIs to the last profile GUI (e.g., the GUI associated with profile 20) if the last profile is the appropriate profile.

Accordingly, the thermostat 400 having the profile listing including the preset profiles preloaded thereon substantially streamlines installation and requires little user skill or knowledge as all the user (e.g., installer) has to do when installing the thermostat 400 within the room 100 of the building 10 is boot up the thermostat 400 for the first time and select the preset profile that corresponds with the FCU 200 or the PTAC 300 in the room 100. This is particularly useful in a large building like the building 10 that includes many rooms 100 that have the same temperature regulation system 110 being installed in each room 100. Therefore, the installer, after determining which preset profile applies for the installations, can configure each thermostat 400 in about thirty seconds or less and in one step following the thermostat 400 being connected to power and powered on for the first time. Previously, each thermostat in each room would have to be individually configured by manually inputting each feature and accessory of the temperature regulation system in the room of installation, which requires significantly more knowledge, skill, and effort/time. Therefore, a single installer can install many of the thermostats 400 throughout the building 10 is a significantly more efficient manner, while also significantly reducing installation errors that may otherwise occur through a manual or custom profile configuration process.

In some instances, the manufacturer or the supplier may perform the initial boot up and profile selection process. By way of example, a customer may have a large project where the FCUs 200 or PTACs 300 being installed in each room 100 of the building 10 is already known at the time of placing the order for the thermostats 400. By way of another example, the thermostats 400 may be sold in kits with the FCUs 200 or the PTACs 300. In either instance, the manufacturer or the supplier can perform the initial boot up and profile selection process. Such "pre-selection" even further streamlines end user installation where all the user has to do is install the thermostat 400 within the room 100 and power on the thermostat 400 as the thermostat 400 will already be pre-configured for the temperature regulation system 110 being installed in the room 100.

In some instances, the user may make an incorrect selection or a different FCU 200 or PTAC 300 may be installed in a room 100 (e.g., in response to the current FCU 200 or PTAC 300 needing replacement). In such instances, the user can engage the user input 430 of the thermostat 400, after the selection of a preset profile at initial setup, to select the "reset" profile that returns the thermostat 400 back to factory settings with no profile set like prior to the initial setup. Selecting the "reset" profile erases the current selected profile, reboots the thermostat 400, and then directs the user to the profile selection GUI for profile selection, as described above with respect to the initial startup process.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The invention claimed is:
1. A temperature regulation system comprising:
   a thermostat including:
      a user interface;
      a memory configured to store a profile listing including a plurality of preset profiles, the profile listing preloaded thereon prior to the thermostat being turned on for a first time, each of the plurality of preset profiles associated with one of a plurality of temperature regulation units and having a different combination of identifying parameters for features and accessories, the plurality of temperature regulation units including (a) a plurality of different fan coil units and (b) a plurality of different packaged terminal air conditioning units; and
      a processor configured to perform an initial boot up and profile selection process when the thermostat is powered on for the first time, wherein, to perform the initial boot up and profile selection process, the processor is configured to:

transition the thermostat from an initial off state to a boot up state in response to the thermostat being powered on for the first time;
transition from the boot up state directly to a profile selection state in response to the thermostat booting up for the first time, wherein transitioning from the boot up state directly to the profile selection state includes displaying a profile selection graphical user interface on a display of the user interface, and wherein the profile selection graphical user interface facilitates configuring the thermostat in a single user configuration step by selecting a respective profile from the plurality of preset profiles based on a temperature regulation unit connected to the thermostat; and
receive a selection of the respective profile based on a user input provided to the user interface; and
configure the thermostat according to the respective profile to facilitate controlling the temperature regulation unit connected thereto based on the identifying parameters of the respective profile.

2. The temperature regulation system of claim 1, wherein the profile selection graphical user interface includes a plurality of individual profile graphical user interfaces, and wherein each one of the plurality of individual profile graphical user interfaces is associated with one of the plurality of preset profiles.

3. The temperature regulation system of claim 2, wherein the user interface facilitates cycling through each of the plurality of individual profile graphical user interfaces to make the selection of the respective profile.

4. The temperature regulation system of claim 3, wherein, when displaying the profile selection graphical user interface, the processor is configured to default to displaying a respective one of the plurality of individual profile graphical user interfaces at a middle of the plurality of individual profile graphical user interfaces.

5. The temperature regulation system of claim 1, further comprising the temperature regulation unit.

6. The temperature regulation system of claim 5, wherein the temperature regulation unit is a fan coil unit associated with the respective profile.

7. The temperature regulation system of claim 5, wherein the temperature regulation unit is a packaged terminal air conditioning unit associated with the respective profile.

8. The temperature regulation system of claim 1, wherein the identifying parameters identify a type of a respective temperature regulation unit, available modes for the respective temperature regulation unit, a number of fan speeds for the respective temperature regulation unit, whether the respective temperature regulation unit includes a remote sensor positioned remote from the thermostat and a location of the remote sensor, and whether the respective temperature regulation unit includes a pipe sensor.

9. The temperature regulation system of claim 8, wherein the type of the respective temperature regulation unit is one of a plurality of types of temperature regulation units, and wherein the plurality of types of temperature regulation units includes a 2-pipe fan coil unit, a 4-pipe fan coil unit, a packaged terminal air conditioning unit that provides one of a heating functionality or a cooling functionality, and a packaged terminal air conditioning unit that provides both of the heating functionality and the cooling functionality.

10. A method for configuring a thermostat, the method includes:
storing a profile listing including a plurality of preset profiles onto a memory of the thermostat during manufacture of the thermostat such that the profile listing is preloaded onto the thermostat prior to the thermostat being turned on for a first time, each of the plurality of preset profiles associated with one of a plurality of temperature regulation units and having a different combination of identifying parameters for features and accessories, the plurality of temperature regulation units including (a) a plurality of different fan coil units and (b) a plurality of different packaged terminal air conditioning units;
installing the thermostat within a room including an installed temperature regulation unit;
powering on the thermostat for the first time;
displaying, by the thermostat, a profile selection graphical user interface in response to powering on for the first time, wherein the profile selection graphical user interface facilitates configuring the thermostat in a single user configuration step by selecting a respective profile from the plurality of preset profiles based on the installed temperature regulation unit connected to the thermostat;
receiving, by the thermostat, a selection of the respective profile based on a user input provided to a user interface of the thermostat; and
configuring, by the thermostat, the thermostat according to the respective profile to facilitate controlling the installed temperature regulation unit connected thereto based on the identifying parameters of the respective profile.

11. The method of claim 10, further comprising:
receiving, by the thermostat, unit information from the installed temperature regulation unit; and
providing, by the thermostat, a recommended selection of the respective profile associated with the installed temperature regulation unit based on the unit information.

12. The method of claim 10, wherein the profile selection graphical user interface includes a plurality of individual profile graphical user interfaces, and wherein each one of the plurality of individual profile graphical user interfaces is associated with one of the plurality of preset profiles.

13. The method of claim 12, wherein the user interface facilitates cycling through each of the plurality of individual profile graphical user interfaces to make the selection of the respective profile.

14. The method of claim 10, wherein the identifying parameters identify a type of a respective temperature regulation unit, available modes for the respective temperature regulation unit, a number of fan speeds for the respective temperature regulation unit, whether the respective temperature regulation unit includes a remote sensor positioned remote from the thermostat and a location of the remote sensor, and whether the respective temperature regulation unit includes a pipe sensor.

15. The method of claim 14, wherein the type of the respective temperature regulation unit is one of a plurality of types of temperature regulation units, and wherein the plurality of types of temperature regulation units includes a 2-pipe fan coil unit, a 4-pipe fan coil unit, a packaged terminal air conditioning unit that provides one of a heating functionality or a cooling functionality, and a packaged terminal air conditioning unit that provides both of the heating functionality and the cooling functionality.

16. A temperature regulation system comprising:
a thermostat including:
a user interface;
a memory configured to store a profile listing including a plurality of preset profiles, the profile listing preloaded thereon prior to the thermostat being turned on for a first time, each of the plurality of preset profiles associated with one of a plurality of temperature regulation units and having a different combination of identifying parameters for features and accessories, the plurality of temperature regulation units including (a) a plurality of different fan coil units and (b) a plurality of different packaged terminal air conditioning units; and a processor configured to perform a profile selection process when the thermostat is powered on for the first time, wherein, to perform the profile selection process, the processor is configured to:
  display a profile selection graphical user interface in response to powering on for the first time, wherein the profile selection graphical user interface facilitates configuring the thermostat in a single user configuration step by selecting a respective profile from the plurality of preset profiles based on a temperature regulation unit connected to the thermostat;
  receive a selection of the respective profile based on a user input provided to the user interface; and
  configure the thermostat according to the respective profile to facilitate controlling the temperature regulation unit connected thereto based on the identifying parameters of the respective profile.

17. The temperature regulation system of claim 16, wherein the identifying parameters identify a type of a respective temperature regulation unit, available modes for the respective temperature regulation unit, a number of fan speeds for the respective temperature regulation unit, whether the respective temperature regulation unit includes a remote sensor positioned remote from the thermostat and a location of the remote sensor, and whether the respective temperature regulation unit includes a pipe sensor, wherein the type of the respective temperature regulation unit is one of a plurality of types of temperature regulation units, and wherein the plurality of types of temperature regulation units includes a 2-pipe fan coil unit, a 4-pipe fan coil unit, a packaged terminal air conditioning unit that provides one of a heating functionality or a cooling functionality, and a packaged terminal air conditioning unit that provides both of the heating functionality and the cooling functionality.

* * * * *